(12) United States Patent
Long et al.

(10) Patent No.: US 12,247,156 B2
(45) Date of Patent: Mar. 11, 2025

(54) RE-CROSSLINKABLE PARTICLE FOR CONFORMANCE CONTROL AND TEMPORARY PLUGGING

(71) Applicant: The Curators of the University of Missouri, Columbia, MO (US)

(72) Inventors: Yifu Long, Rolla, MO (US); Bowen Yu, Rolla, MO (US); Baojun Bai, Rolla, MO (US); Thomas Schuman, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 282 days.

(21) Appl. No.: 17/791,619

(22) PCT Filed: Jan. 10, 2020

(86) PCT No.: PCT/US2020/013094
§ 371 (c)(1),
(2) Date: Jul. 8, 2022

(87) PCT Pub. No.: WO2021/141598
PCT Pub. Date: Jul. 15, 2021

(65) Prior Publication Data
US 2023/0055352 A1    Feb. 23, 2023

(51) Int. Cl.
C09K 8/514    (2006.01)
C09K 8/42     (2006.01)

(52) U.S. Cl.
CPC .................... C09K 8/426 (2013.01)

(58) Field of Classification Search
CPC ........ C09K 8/426; C09K 8/512; C09K 8/514; C08F 8/30; C08F 220/56; E21B 33/13
See application file for complete search history.

(56) References Cited

U.S. PATENT DOCUMENTS

| | | | |
|---|---|---|---|
| 3,306,870 A | 2/1967 | Eilers et al. | |
| 4,569,393 A | 2/1986 | Bruning et al. | |
| 4,657,944 A | 4/1987 | Bruning et al. | |
| 4,793,416 A | 12/1988 | Mitchell | |
| 4,903,767 A | 2/1990 | Shu et al. | |
| 4,921,635 A | 5/1990 | Enick | |
| 4,941,533 A | 7/1990 | Buller et al. | |
| 5,399,269 A | 3/1995 | Moradi-Araghi | |
| 5,423,380 A | 6/1995 | Johnston et al. | |
| 5,465,792 A | 11/1995 | Dawson et al. | |
| 5,480,933 A | 1/1996 | Fox et al. | |
| 5,735,349 A | 4/1998 | Dawson et al. | |
| 6,165,947 A | 12/2000 | Chang et al. | |
| 6,454,003 B1 | 9/2002 | Chang et al. | |
| 6,764,981 B1 | 7/2004 | Eoff et al. | |
| 6,981,552 B2 | 1/2006 | Reddy et al. | |
| 7,007,752 B2 | 3/2006 | Reddy et al. | |
| 7,091,160 B2 | 8/2006 | Dao et al. | |
| 7,300,973 B2 | 11/2007 | Chang et al. | |
| 7,322,414 B2 | 1/2008 | Reddy et al. | |
| 7,644,764 B2 | 1/2010 | Berkland et al. | |
| 8,158,720 B2 | 4/2012 | Reddy et al. | |
| 8,183,184 B2 | 5/2012 | Berkland et al. | |
| 8,389,446 B2 | 3/2013 | Moradi-Araghi et al. | |
| 8,822,388 B2 | 9/2014 | Burns et al. | |
| 9,139,762 B2 | 9/2015 | Moradi-Araghi et al. | |
| 9,267,075 B2 | 2/2016 | Moradi-Araghi et al. | |
| 9,701,887 B2 | 7/2017 | Burns et al. | |
| 9,777,122 B2 | 10/2017 | O'Brien et al. | |
| 10,000,683 B2 | 6/2018 | Galindo et al. | |
| 10,323,174 B2 | 6/2019 | Guan et al. | |
| 10,407,612 B2 | 9/2019 | Guan et al. | |
| 10,457,857 B2 | 10/2019 | Perry et al. | |
| 11,268,009 B2 | 3/2022 | Bai et al. | |
| 2004/0175948 A1 | 9/2004 | DeSimone et al. | |
| 2004/0182575 A1* | 9/2004 | Reddy .................... | C09K 8/512 166/305.1 |
| 2007/0204989 A1 | 9/2007 | Tang | |

(Continued)

FOREIGN PATENT DOCUMENTS

| | | |
|---|---|---|
| CN | 105504158 | 4/2016 |
| EP | 1 538 301 | 6/2005 |

(Continued)

OTHER PUBLICATIONS

Yang et al., "Highly Elastic and Ultratough Hybrid Ionic-Covalent Hydrogels with Tunable Structures and Mechanics," Advanced Materials, vol. 30, No. 18, Mar. 25, 2018, 1707071, 9 pages.
Extended Search Report in European Patent Application No. 20911458.6 dated Sep. 20, 2023, 8 pages.
Coste et al., "In-Depth Fluid Diversion by Pre-Gelled Particles. Laboratory Study and Pilot Testing, " 2000 SPE/DOE Improved Oil Recovery Symposium held in Tulsa, Oklahoma, Apr. 3-5, 2000, 8 pages.
Sydansk et al., "Gel conformance treatments increase oil production in Wyoming," Oil and Gas Journal, Jan. 20, 1992, vol. 90:3, 3 pages. (abstract only attached).
Chauveteau et al., "Controlling Gelation Time and Microgel Size for Water Shutoff," SPE 59317, Society of Petroleum Engineers Inc., Prepared for Presentation at the 2000 SPE/DOE Improved Oil Recovery Symposium held in Tulsa, Oklahoma, Apr. 3-5, 2000, 8 pages.
Rousseau et al., "Rheology and Transport in Porous Media of New Water Shutoff/Conformance Control Microgels," SPE 93254, Society of Petroleum Engineers Inc., Prepared for Presentation at the 2005 SPE International Symposium on Oilfield Chemistry held in Houston, Texas, Feb. 2-4, 2005, 12 pages.

(Continued)

Primary Examiner — Kumar R Bhushan
(74) Attorney, Agent, or Firm — HOVEY WILLIAMS LLP

(57) ABSTRACT

The present invention generally relates to the composition of particle gels for conformance control, well drilling and well treatments. More particularly, this invention relates to swellable polymer particle gels that can re-crosslink, i.e., reassociate and self-heal, at subterranean conditions. These particle gels can be deployed to improve the conformance of water flooding of especially matrix bypass events (MBEs), that are also known as void space conduits. Moreover, these particle gels can be deployed for controlling the water production and increasing of petroleum recovery. The inventive particles can also be deployed as diverter for well stimulation.

25 Claims, 1 Drawing Sheet

(56) References Cited

U.S. PATENT DOCUMENTS

| | | | |
|---|---|---|---|
| 2010/0234252 | A1 | 9/2010 | Moradi-Araghi et al. |
| 2011/0036583 | A1 | 2/2011 | Willberg et al. |
| 2011/0094746 | A1 | 4/2011 | Allison et al. |
| 2012/0037364 | A1 | 2/2012 | Guan et al. |
| 2012/0067581 | A1 | 3/2012 | Auzerais et al. |
| 2012/0285691 | A1 | 11/2012 | Berger et al. |
| 2013/0000911 | A1 | 1/2013 | Reddy et al. |
| 2014/0090850 | A1 | 4/2014 | Benicewicz et al. |
| 2014/0102707 | A1 | 4/2014 | Moradi-Araghi et al. |
| 2014/0131043 | A1 | 5/2014 | Moradi-Araghi et al. |
| 2014/0144628 | A1 | 5/2014 | Moradi-Araghi et al. |
| 2016/0032170 | A1 | 2/2016 | Li et al. |
| 2016/0137906 | A1 | 5/2016 | Guan et al. |
| 2017/0166797 | A1 | 6/2017 | Reddy |
| 2018/0002592 | A1 | 1/2018 | Guan et al. |
| 2018/0230372 | A1 | 8/2018 | Liang et al. |
| 2019/0119559 | A1* | 4/2019 | O'Toole .................. C09K 8/594 |

FOREIGN PATENT DOCUMENTS

| | | |
|---|---|---|
| RU | 2 496 977 | 10/2013 |
| RU | 2511444 | 4/2014 |
| RU | 2517342 | 5/2014 |
| WO | 98/06929 | 2/1998 |
| WO | 2009/131881 | 10/2009 |
| WO | 2010/144588 | 12/2010 |
| WO | 2013/006275 | 1/2013 |
| WO | 2013/112664 | 8/2013 |
| WO | 2017/210486 | 12/2017 |

OTHER PUBLICATIONS

Zaitoun et al., "Using Microgels To Shut Off Water in a Gas Storage Well," SPE 106042, Society of Petroleum Engineers, Prepared for Presentation at the 2007 SPE International Symposium on Oilfield Chemistry held in Houston, Texas, Feb. 28-Mar. 2, 2007, 8 pages.

Al-Anazi et al., "Use of a pH Sensitive Polymer for Conformance Control," SPE 73782, Society of Petroleum Engineers Inc., Prepared for Presentation at the SPE International Symposium and Exhibition on Formation Damage Control held in Lafayette, Louisiana, Feb. 20-21, 2002, 8 pages.

Benson et al., "Development and Use of a Simulation Model for Mobility/Conformance Control Using a pH-Sensitive Polymer," SPE 109665, Society of Petroleum Engineers, Prepared for Presentation at the 2007 SPE Annual Technical Conference and Exhibition held in Anaheim, California, Nov. 11-14, 2007, 10 pages.

Pritchett et al., "Field Application of a New In-Depth Waterflood Conformance Improvement Tool," SPE 84897, Society of Petroleum Engineers Inc., Prepared for Presentation at the SPE International Improved Oil Recovery Conference in Asia Pacific held in Lumpur, Malaysia, Oct. 20-21, 2003, 8 pages.

Frampton et al., "Development of a novel waterflood conformance control system," SPE 89391, Society of Petroleum Engineers Inc., Prepared for Presentation at the 2004 SPE/DOE Fourteenth Symposium on Improved Oil Recovery held in Tulsa, Oklahoma, Apr. 17-21, 2004, 9 pages.

Bai et al., "Field and Lab Experience with a Successful Preformed Particle Gel Conformance Control Technology," SPE 164511, Society of Petroleum Engineers, Prepared for Presentation at the SPE Production and Operations Symposium held in Oklahoma City, Oklahoma, Mar. 23-26, 2013, 17 pages.

Zhang et al., "Preformed-Particle-Gel Transport Through Open Fractures and Its Effect on Water Flow," SPE 129908, Society of Petroleum Engineers, SPE Journal, Jun. 2011, pp. 388-400.

Imqam et al., "Preformed Particle Gel Extrusion through Open Conduits during Conformance Control Treatments," SPE-169107-MS, Society of Petroleum Engineers, Prepared for Presentation at the SPE Improved Oil Recovery Symposium held in Tulsa, Oklahoma, Apr. 12-16, 2014, 15 pages.

Almohsin et al., SPE-169078-MS, "Transport of Nanogel through Porous Media and Its Resistance to Water Flow," Society of Petroleum Engineers, Prepared for Presentation at the SPE Improved Oil Recovery Symposium held in Tulsa, Oklahoma, Apr. 12-16, 2014, 14 pages.

Wang et al., "Mechanically robust re-crosslinkable polymeric hydrogels for water management of void space conduits containing reservoirs," Chemical Engineering Journal, 2017, vol. 317, pp. 952-960.

Machine translation of CN105504158, 14 pages.

Lee et al. (2007). "CO2-in-Water Emulsion-Templated Poly(vinyl alcohol) Hydrogels Using Poly(vinyl acetate)-Based Surfactants," Macromolecules, 40(6), 1955-1961.

Yamamoto et al. (2003). "Synthesis and Thermosensitive Properties of Poly[(N-vinylamide)-co-(vinyl acetate)]s and Their Hydrogels," Macromolecular Chemistry and Physics, 204(7), 1027-1033.

Ranjha et al. "Swelling and Aspirin Release Study: Cross-Linked pH-Sensitive Vinyl Acetate-co-Acrylic Acid (VAC-co-AA) Hydrogels," Drug Development and Industrial Pharmacy 34.5 (2008): 512-521.

EP1538301 Machine Translation, 15 pages.

Kharin A. N. et al., Kurs himii. Uchebnoe posobie dlya nekhimicheskih special nostej vuzov (Chemistry course. Textbook for non-chemical specialties of universities), Moscow, "Vysshaya shkola", 1975, p. 381. (publication not available).

Ugaj, Y. A., Obshchaya i neorganicheskaya himiya (General and inorganic chemistry), Moscow, "Vysshaya shkola", 1997, p. 9.

International Search Report and Written Opinion mailed Mar. 24, 2020 in corresponding PCT/US20/13094, 11 pages.

International Preliminary Report on Patentability mailed Jul. 21, 2022 in corresponding PCT/US20/13094, 8 pages.

Reddy et al., "A natural polymer-based cross-linker system for conformance gel systems," SPE Journal, Jun. 1, 2003, 8 (02): 99-106, https://doi.org/10.2118/84937-PA, 7 pages. (abstract only attached).

Reddy et al., "Natural polymer-based compositions designed for use in conformance gel systems," SPE Journal, Dec. 15, 2005, 10 (04): 385-393, https://doi.org/10.2118/84510-PA, 7 pages. (abstract only attached).

* cited by examiner

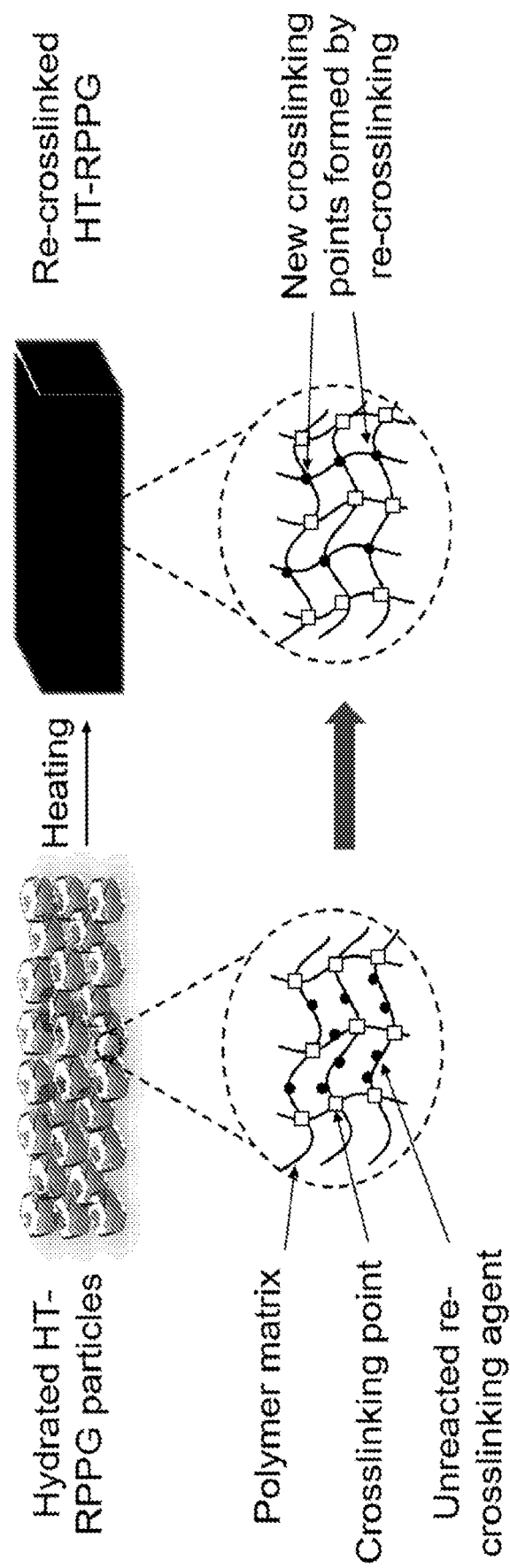

RE-CROSSLINKABLE PARTICLE FOR CONFORMANCE CONTROL AND TEMPORARY PLUGGING

RELATED APPLICATIONS

This application claims priority to PCT International Patent Application No. PCT/US2020/013094, filed Jan. 10, 2020. This application is hereby incorporated by reference in its entirety.

FIELD OF INVENTION

The present invention relates to the composition of particle gels for conformance control, well drilling, and well treatments. More particularly, the present invention relates to swellable polymer particle gels that can re-crosslink, i.e., reassociate and self-heal, at subterranean conditions. These particle gels can be deployed to improve the conformance of water flooding of especially matrix bypass events (MBEs), that are also known as void space conduits. Moreover, these particle gels can be deployed for controlling the water production and increasing of petroleum recovery. The inventive particle gels can also be deployed as diverter for well stimulation.

BACKGROUND

Certain processes in the oil and gas production industry have utilized polymer gels in an attempt to improve recovery. In oilfields, wells and pipelines become fractured, and sealant compositions can be used to plug the fractures. In well drilling and well treatments, lost circulation materials (LCM) can be used to seal off lost-circulation zones within the well. However, prior art gels used in such processes suffer a number of deficiencies, such as extrusion, dehydration, and mechanical vulnerability, particularly in harsh subterranean environments (i.e., high temperature and high salinity). What is needed are compositions that overcome the deficiencies of previous polymer gels and also provide an alternative for conformance control, for example during water flooding.

SUMMARY

One or more embodiments of the present invention generally concern a swellable composition for controlling fluid flow. The swellable composition comprises a polymer matrix, a crosslinking agent, and re-crosslinking agent. The polymer matrix comprises a monomer that is crosslinkable by the re-crosslinking agent at subterranean conditions.

One or more embodiments of the present invention generally concern a method of forming a swellable composition. The method comprises: (a) polymerizing a monomer that is crosslinkable by a re-crosslinking agent at subterranean conditions in the presence of a crosslinking agent and the re-crosslinking agent to form a polymer matrix and embed the re-crosslinking agent within the polymer matrix; (b) drying the polymer matrix to form a dried polymer matrix; and (c) grinding the dried polymer matrix to form the swellable composition.

One or more embodiments of the present invention generally concern a method of forming a gel formation in a target zone of a subterranean environment. The method comprises: (a) dispersing a swellable composition comprising a polymer matrix, a crosslinking agent, and re-crosslinking, wherein the polymer matrix comprises a monomer that is crosslinkable by the re-crosslinking agent at subterranean conditions, into a carrier fluid, thereby causing the swellable composition to swell; and (b) introducing the carrier fluid comprising the swellable composition into the target zone having a temperature of at least 50° C., thereby causing the re-crosslinking agent to react with the monomer and form the gel formation.

BRIEF DESCRIPTION OF THE FIGURES

Embodiments of the present invention are described herein with reference to the following drawing FIGURES, wherein:

FIG. 1 is a schematic depiction of the HT-RPPG being re-crosslinked upon exposure to heat, in accordance with one embodiment of the present invention.

DETAILED DESCRIPTION

In various embodiments, a new class of particle gel compositions is provided that can re-crosslink, i.e., reassociate and self-heal (See. FIG. 1), to reform an ostensibly bulk gel material at subterranean conditions and maintain the bulk gel stability under relatively harsh polymer hydrogel conditions (e.g., high-temperature and high-salinity conditions). The particle gel compositions disclosed are hereafter referred to as high temperature re-crosslinking preformed particle gels (HT-RPPG). In one or more embodiments, the composition of the HT-RPPG comprises (consists of, or consists essentially of): (a) a polymer matrix; (b) a crosslinking agent; and (c) a re-crosslinking agent. In one or more embodiments, the composition of the HT-RPPG comprises (consists of, or consists essentially of): (a) a polymer matrix; (b) a crosslinking agent; (c) a re-crosslinking agent; (d) and additives. The polymer matrix is generally formed from and comprises at least one monomer that is interactive with the re-crosslinking agent (i.e., the monomer is crosslinkable by said re-crosslinking agent). Regardless the embodiment, generally, all of the aforementioned components are homogeneously distributed when the HT-RPPG is synthesized. In various embodiments, the HT-RPPG may comprise at least 50, 60, 70, 80, 90, 95, or 99 weight percent as polymer matrix, with the total weight of the polymer matrix, crosslinking agent, re-crosslinking agent, and additives (if present) taken as 100 percent by weight. Furthermore, in various embodiments, the HT-RPPG may comprise at least 0.01, 0.02, 0.04, 0.06, 0.08, 0.1, 0.12, 0.14, or 0.16 and/or less than 20, 15, 10, 5, 4, 3, 2, or 1 weight percent of the crosslinking agent, the re-crosslinking agent, and/or the additives.

Generally, in various embodiments, the method for forming the HT-RPPG may comprise: (a) polymerizing the monomer, in the presence of the crosslinking agent and the re-crosslinking agent within solution, to form the polymer matrix and to embed the re-crosslinking agent within the polymer matrix; (b) drying of the polymer matrix to form a dried polymer matrix; and (c) grinding the dried polymer matrix to form a water-swellable, particulate composition. In one or more embodiments, the polymerizing of step (a) occurs at a temperature of at least 20, 25, 30, 35, 40, 45, or 50° C. and/or less than 200, 150, 100, 75, or 60° C. Furthermore, in various embodiments, the polymerizing may comprise ultrasonication that occurs for at least 10, 20, or 30 minutes and/or less than 6, 5, 4, or 3 hours. Additionally, in various embodiments, the polymerizing may occur for at least 1, 2, 3, or 4 hours and/or less than 18, 15, 12, or 10 hours.

As used herein, the "polymer matrix" refers to a polymer network formed via free radical polymerization in solution wherein the polymer chains were connected via crosslinking, which takes place simultaneously with the growth of polymer chains. The polymer matrix can be obtained by either homopolymerization or copolymerization, and is generally formed from and comprises at least one monomer that is reactive with the re-crosslinking agent (i.e., the monomer is crosslinkable by said re-crosslinking agent), particularly at subterranean conditions. In particular embodiments, the monomer is crosslinkable by the re-crosslinking agent at high temperature (at least 50° C., 60° C., 70° C., 80° C., 90° C., 100° C.) and/or high-salinity subterranean conditions. Additionally, during the synthesis of the HT-RPPG, the re-crosslinking agent becomes embedded within the polymer matrix, which provides close proximity for the monomer and the re-crosslinking to react when the water-swollen, reassembled HT-RPPG mass of particles is exposed to a particular target temperature in the subterranean environment.

In certain embodiments, the polymer chains (backbone) of the polymer matrix comprise a homopolymer, which is formed from a single type of monomer. In certain embodiments, the monomer is an amide monomer (i.e., a monomer comprising an amide functional group). In certain embodiments, the amide monomer is selected from the group consisting of acrylamide, methacrylamide, N-methylacrylamide, N-tert-butylacrylamide, N-ethylacrylamide, N-hydroxyethyl acrylamide, N-isopropylacrylamide, N. N-diethylacrylamide, dimethylaminopropyl acrylamide, dimethylaminopropyl methacrylamide, acrylamide, N-isopropylacrylamide, N,N-dimethylacrylamide, N,N-diethylacrylamide, dimethylaminopropyl acrylamide, dimethylaminopropyl methacrylamide, N-vinyl formamide. Particularly preferred nonionic amide monomers include acrylamide, N-methylacrylamide, N,N-dimethylacrylamide, and methacrylamide. Advantageously, amide monomers in the polymer matrix can react with the re-crosslinking agent through transamidation as shown in the reaction scheme below.

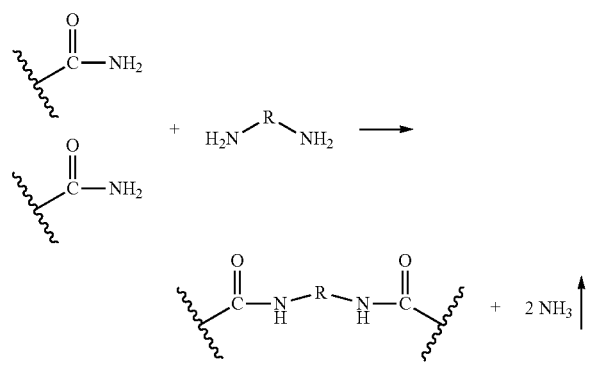

In certain other embodiments, the polymer chains (backbone) of the polymer matrix comprise a copolymer, which is formed from two or more types of monomers. In certain such embodiments, at least one of the two or more types of monomers comprises a monomer that can react with the re-crosslinking agent, such as under appropriate stimulus (e.g., high temperature) at subterranean conditions. In certain embodiments, the at least one monomer comprises a sulfonate, sulfate, or phosphate monomer. In certain embodiments, the monomer comprises sulfonate, sulfate, or phosphate group(s); sodium or potassium vinylsulfonate and vinyl sulfate salts like sodium or potassium vinyl sulfates; phenyl vinyl sulfonate salts like sodium or potassium phenyl vinyl sulfate; and/or vinyl phosphate salts like sodium or potassium vinyl sulfate. In particularly preferred embodiments, the monomer is 2-acrylamido-2-methyl-1-propane-sulfonic acid sodium salt (Na-AMPS).

In certain embodiments, the at least one of the two or more monomers comprises a water-soluble monomer that contains cationic pendant groups, such as diallyldimethyl-ammonium chloride, (3-(methacryloylamino) propyl) trimethyl ammonium chloride, (2-(methacryloyloxy) ethyl) trimethyl ammonium chloride, and/or vinylbenzyl trimethyl ammonium chloride. In other embodiments, the alternative monomers with cationic pendant groups include dimethylaminoethylacrylate methyl chloride quaternary salt, dimethylaminoethylacrylate benzyl chloride quaternary salt, and/or dimethylaminoethylmethacrylate methyl chloride quaternary salt.

In certain embodiments, the at least one of the two or more monomers comprises a nonionic monomer. Representative nonionic monomers include hydroxyethyl acrylate, hydroxypropyl acrylate, hydroxyethyl methacrylate, hydroxypropyl methacrylate, dimethylaminoethylacrylate (DMAEA), and dimethylaminoethyl methacrylate (DMAEM). Generally, C8-C22 backbones can be employed. Exemplary hydrophobic monomers include the higher alkyl esters such as octyl, decyl, dodecyl, tridecyl, tetradecyl, octadecyl, etc. of α,β-ethylenically unsaturated carboxylic acids, such as acrylates and methacrylates. Also included are alkyl esters having 8 to 22 carbon atoms with ethylenically unsaturated carboxylic acids such as maleic anhydride, fumaric acid, itaconic acid and aconitic acid, alkylaryl esters of ethylenically unsaturated carboxylic acids such as nonyl-o-phenyl acrylate, nonyl-α-phenyl methacrylate, dodecyl-α-phenyl acrylate and dodecyl-α-phenyl methacrylate; N-alkyl, ethylenically unsaturated amides such as N-octadecyl acrylamide, N-octadecyl methacrylamide, N,N-dioctyl acrylamide and similar derivatives thereof; α-olefins such as 1-octene, 1-decene, I-dodecene and I-hexadecene; vinyl alkylates wherein alkyl has at least 8 carbons such as vinyl laurate and vinyl stearate; vinyl alkyl ethers such as dodecyl vinyl ether and hexadecyl vinyl ether; N-vinyl amides such as N-Vinylpyrrolidone, N-vinyl lauramide and N-vinyl stearamide; and alkyl aromatics such as t-butyl styrene or t-butyl phenyl.

In one or more embodiments, when the polymer matrix comprises a copolymer, the polymer matrix may comprise at least 40, 45, 50, 55, 60, 65, 70, 75, or 80 and/or less than 99, 95, 90, or 85 molar percent of the at least one monomer that can react with the re-crosslinking agent, based on the total molar content of the polymer matrix taken as 100 percent.

In certain embodiments, the polymer matrix does not include, and is substantially free of, $CO_2$-philic moieties. $CO_2$-philic moieties refer to molecular entities in the polymer that is attracted to $CO_2$ molecules and has strong interactions with $CO_2$ that are more thermodynamically favorable than the interactions with polar solvents. Specifically, in certain embodiments, the polymer matrix is substantially free of $CO_2$-philic monomers such as vinyl benzoate, benzyl vinyl formate, ethyl vinyl ether, methyl vinyl ether, vinylidene fluoride, lactic acid or lactic acid cyclic dimmer, glycolic acid or glycolide, hexamethylcyclotrisiloxane, 1H,1H,2H,2H-perfluorooctyl methacrylate, and vinyl acetate.

As used herein, the "crosslinking agent" refers to any reagents that can connect the polymer chains via free radical crosslinking during polymer matrix synthesis, which takes place simultaneously with the formation of polymer chains. In certain embodiments, the crosslinking agent is a divinyl monomer that can copolymerize with vinyl monomers and form crosslinking points as the propagation of polymers. At this point, the crosslinking denotes a chemical crosslinking, namely permanent, covalent bonding. Exemplary cross-linkers include methylene bisacrylamide, divinyl sulfone, diethyleneglycol diallyl ether, and the like and combinations thereof. In preferred embodiments, the crosslinking agent is methylene bisacrylamide (MBA).

In certain other embodiments, the crosslinking agent comprises diacrylyl tertiary amide, diacrylylpiperazine, diallyltartardiamide, dihydroxyethylene-bis-acrylamide, bis-acrylylcystamine, trimethylolpropane trimethacrylate, propylenegycol triacrylate, tripropyleneglycol diacrylate, allyl methacrylate, triethyleneglycol dimethacrylate, tetrahydrofurfuryl methacrylate, trimethylolpropane triacrylate, or combinations thereof. In certain embodiments, the cross-linking agent comprises a multifunctional crosslinker. Such multifunctional crosslinkers may include pentaerythritol triacrylate, 1,5 pentane diol dimethacrylate, pentaerythritol triallylether, or combinations thereof.

As used herein, the "re-crosslinking agent" refers to any latent reagents that can react with the polymer matrix, thereby generating self-healing and discrete particle reassociations, to thus produce a bulk gel at subterranean conditions comprised of discrete polymer gel particles that associate to form an entirety possessing bulk gel properties. The re-crosslinking agent is generally embedded within the polymer matrix when HT-RPPG is synthesized. At higher temperature subterranean conditions, the re-crosslinking agent is able to react with the sidegroups of the polymer matrix, which forms covalent bonding. In some embodiments, the re-crosslinking agent can react with the carboxylate group or amide group among the matrix wherein the crosslinking take place through transamidation.

The re-crosslinking agent can be either a single component or multiple components, which comprise multiple crosslinkers together as a combination. The re-crosslinking agent is generally an oligosaccharide or polysaccharide rich in amino groups, wherein the amino groups are at least 75, 80, 85, 90, or 95 percent primary amines. The oligosaccharides and polysaccharides can be either natural raw materials or functionalized amino derivatives.

In certain embodiments, the re-crosslinking agent is an aminated alginate, that is alginic acid functionalized with primary amine. In certain such embodiments, the alginates are unbranched polysaccharides comprising (or consisting of) β-D-mannuronate (M) and α-L-guluronate (G). In particular embodiments, the alginates comprise sequences of M (M-blocks), G (G-blocks), and residues interspersed with MG sequences (MG-blocks). The alginates can be obtained from both algal and/or bacterial sources. Preferably, the aminated alginate is obtained via the grafting or Hofmann reactions. However, in alternative embodiments, an alternative pathway to produce the animated alignate can involve reductive amination.

In certain embodiments, the re-crosslinking agent is chitosan or modified chitosan functionalized with primary amine. Chitosan is a linear polymer occurring naturally only in certain fungi Mucoraceae and is chemically comprised of glucosamine and N-acetylglucosamine monomers linked through β-(1-4) glycosidic linkages. One exemplary chitosan modification can be achieved via the sequential phthaloylation, nucleophilic substitution reaction, and dephthaloylation.

In certain embodiments, the re-crosslinking agent is a dextran amine, which is the dextran functionalized with primary amine. Dextran is a complex branched glucan, namely the branched poly α-d glucosides of microbial origin having predominantly glycosidic bonds. The polymer main chain consists of α-1,6 glycosidic linkages between glucose monomers, with branches from α-1,3 linkages. This characteristic branching distinguishes a dextran from a dextrin, which is a straight chain glucose polymer-tethered by α-1,4 or α-1,6 linkages. In certain embodiments, the aminated dextran is obtained via the reductive amination involved oxidization and imine reduction. Alternatively, the aminated dextran is obtained by deploying non-reductive amination.

In certain embodiments, the re-crosslinking agent can be aminated cellulose, that is cellulose functionalized with primary amine. Cellulose is a polysaccharide consisting of a linear chain of several hundred to many thousands of β (1→4) D-glucose units. Preferably, the aminated cellulose is obtained through a Staudinger reaction or reductive amination.

In certain embodiments, the re-crosslinking agent is aminated guaran, that is functionalized with primary amine. Guaran, also known as guar gum, is a galactomannan polysaccharide extracted from guar beans, which is an exo-polysaccharide composed of the sugars galactose and mannose. The backbone is a linear chain of β (1→4) linked mannose residues to which galactose residues are (1→6) linked at every second mannose, forming short side-branches. Preferably, the aminated guar gum is obtained via carboxymethylation and coupling or amination in basic condition with the presence of aminating agent.

In certain embodiments, the re-crosslinking agent is an aminated heparin, that is the heparin functionalized with primary amine.

In certain embodiments, the re-crosslinking agent is a complex form of amino saccharide and a multivalent metal ion. The multivalent metal ion can be salts of, but not limited to, $Al^{3+}$, $Fe^{3+}$, $Cr^{3+}$, $Ti^{4+}$, $Sn^{4+}$, or $Zr^{4+}$. The ligands can be natural raw materials or the functionalized amino-saccharide. The ligands herein can be the oligosaccharide or polysaccharide that is rich in amino groups, particularly where the amino groups are predominantly primary amines. The ligands complexed with multivalent metal ion via coordination bonding affect the kinetic rate of re-crosslinking. Exemplary ligands include chitosan, aminated chitosan, aminated alginate, aminated dextran, aminated cellulose, aminated heparin, and aminated guaran.

In certain embodiments, the gel compositions comprise one or more additives. The additives herein are defined as any reagents that can facilitate the synthesis of HT-RPPG, can ameliorate the stability of re-crosslinked HT-RPPG, or can enhance the rheology property of HT-RRPG. The additive (or additives) may include one or more components from the following embodiments described herein.

In certain embodiments, the additive is a chelating agent. The chelating agent may be included, for example, to alleviate the detriments of divalent cations (Ca2+ and Mg2+). In certain embodiments, the carrier fluid or formation water is rich of divalent cations, namely the brine with high hardness, such as the formation water of North Sea reservoirs. The divalent cations, in one aspect, induce the gel shrink through screening effect which will be more significant with the hydrolysis of the amide group and the formation of, ionic pedant, the carboxylate group. In another aspect, the gel may undergo severe syneresis due to the excessive crosslinking between divalent cations and polyelectrolytes in gel matrix. The addition of chelating agent described herein can bind with divalent cations forming a complex, and thereby diminish gel contraction and the tendency of syneresis or degradation. Exemplary chelating agents include salts of ethylenediaminetetraacetic acid (EDTA), the salts of citric acid, gluconic acid pentaphosphonate, hexaphosphonate, phosphino-poly(carboxylic acid) (PPCA) salts and amino carboxylate chelating agents such as N-(3-Hydroxypropyl)imino-N,N-diacetic acid, N-(2-Hydroxypropyl)imino-N,N-diacetic acid, N-glycerylimino-N,N-diacetic acid, dihydroxyisopropylimino-N,N-diacetic acid, methylimino-N,N-diacetic acid, 2-methoxyethylimino-N,N-diacetic acid, amidoiminodiacetic acid (sodium amidonitrilo triacetic acid), acetamidoiminodiacetic acid, 3-methoxypropylimino-N,N-diacetic acid, tris (hydroxymethyl) methylimino-N,N-diacetic acid. Other chelating agents include the salts of alginate, hydroxyethyliminodiacetic acid (HEIDA), hydroxyethylethylenediamine triacetic acid (HEDTA), glutamic acid diacetic acid (GLDA) and methylglycine N,N-diacetic acid (MGDA). In preferred embodiments, the chelating agent is the sodium salt of ethylenediaminetetraacetic acid ($Na_2$-EDTA).

In certain embodiments, the additive is a rheological modifier or thickening agent. The rheological modifier herein refers to a water soluble, linear polymer which is introduced to increase the viscosity of gelling solution during HT-RPPG synthesis. In virtue of viscosifying, the re-crosslinking agent therefore can be embedded more homogeneously. Exemplary viscosifers (rheological modifier or thickening agent) include poly(vinyl alcohol), poly(acrylamide) or partially hydrolyzed poly(acrylamide) (HPAM), xanthan gum, and derivatives thereof. Moreover, the incorporation of rheology modifier induces a semi-interpenetrating of network through which the rheology property of re-crosslinking particles can be enhanced.

In certain embodiments, the additive is a nanoparticle solid material (nanomaterial). The nanomaterial, which can be three-dimensional (spherical), one-dimensional (rod shaped), or two-dimensional (platelet) nanomaterial, is introduced to conduct the nanocomposite and, furthermore, improve the thermal stability and rheology properties of re-crosslinked gel. Exemplary three-dimensional nanomaterials include nanosilica, modified nanosilica, nano-sized metal oxide and modified nano-sized metal oxide. Exemplary one-dimensional nanomaterials include carbon nanotubes, nanocrystals, nanofibers, and functionalized or modified nanomaterials thereof. Exemplary two-dimensional nanomaterials include graphene, graphene oxide, and other nanometer-sized, layered particles comprised of silicates or aluminosilicate, such as nanoclays, and functionalized or modified nanomaterials thereof.

In certain embodiments, the additives can include a biocide. A biocide may be added to prevent the undesired biodegradation and to inhibit and control bacterial growth, which may proliferate enzymes that depolymerize polysaccharides, namely the re-crosslinking agent. Exemplary biocides include tetrakis(hydroxymethyl) phosphonium sulfate, sodium hypochlorite, didecyldimethylammonium chloride, tri-n-butyl tetradecyl phosphonium, chloride, and glutaraldehyde. Such biocides can be introduced to stabilize the re-crosslinking agent against bacterial attack.

In certain embodiments, the additive comprises one or more oxygen scavengers. Oxygen scavengers are reducing agents which can consume the dissolved oxygen from aqueous solution through a gradual process of a redox reaction. In certain embodiments, the one or more oxygen scavengers are selected from the group consisting of dithionite salts (i.e., sodium dithionite), thiosulfate salts (i.e., sodium thiosulfate), sulfite salts (i.e., sodium sulfite), bisulfite salts (i.e., sodium bisulfite), and metabisulfite salts persulfate salts (e.g., ammonium persulfate), or combinations thereof. In preferred embodiments, the oxygen scavenger(s) comprise bisulfite salts, such as ammonium bisulfite and sodium bisulfite.

In various embodiments, the HT-RPPG may comprise an average particle size of at least 0.1, 0.2, 0.3, 0.4, or 0.5 mm and/or less than 10, 5, 4, 3, 2, 1, or 0.9 mm.

In various embodiments, the HT-RPPG may comprise an average particle size of 0.1 to 100 µm or as small as 10 nm, which can be obtained through grinding, ball milling or colloidal milling.

Due to its unique formulation, the HT-RPPG exhibits desirable rheological characteristics. In various embodiments, the HT-RPPG may exhibit a storage modulus of at least 50, 100, 200, 300, 500, or 700 Pa and/or a loss modulus of at about 2 to about 100 Pa, preferably about 20 to about 60 Pa, as measured at a frequency of 1 Hz and a stress of 1 Pa at ambient temperature (23° C.). In certain such embodiments, the above rheological characterisitics are exhibited, even after being aged for 1 day, 10 days, 30 days, or 60 days, or 90 days at a temperature of 50° C., 85° C., 100° C., 110° C., 120° C., 130° C., 140° C., or 150° C. Strength of the gel particles will be inversely proportional to the swelling volume of the particles when swollen with (formation) water or brine.

Furthermore, the HT-RPPG may also exhibit desirable swelling properties due to its unique formulation. In various embodiments, the HT-RPPG may exhibit a swelling ratio of at least about 5, 10, 15, 20, 25, 30 and/or less than about 75, 60, 55, 50, or 45 after a time period of 2, 4, 6, 8, 10, 12, 15, 20, 25, 30, 35, or 40 hours at 23° C. or 73° F. in an aqueous solution comprising sea water (TDS~40,000 ppm). The "swelling ratio" refers to the fractional increase in the weight of the particulate gel due to fluid absorption. The swelling ratio may be measured by the following formula:

$$SR = \frac{V_{particle,a}}{V_{particle,b}} = \frac{V_{total,a} - V_{water,a}}{V_{total,b} - V_{water,b}}.$$

In accordance with the above formula, dry particles may be placed into a graduated cylinder and brine (e.g. 1 wt % NaCl) with a certain volume ($V_{water,b}$) may be added. The total volume of the brine and particles ($V_{total,b}$) may then be obtained. The total volume can be read again as $V_{total,a}$ once the particle volume does not increase and is considered fully swollen. The remaining brine may then be screened out and measured again for volume, $V_{water,a}$.

In various embodiments, the H-RPPG is in the form particles having an initial average particle size prior to contacting the fluid and a second average particle size after contacting the fluid and swelling. In such embodiments, the second average particle size can be at least about 5, 10, 15, 20, 25, 30, 35, or 40 times greater than that of the initial average particle size.

Advantageously, the HT-RPPG can maintain the swell ratio, with little or no reduction, over prolonged periods of time when exposed to high temperature and salinity conditions. In various embodiments, the "swollen" HT-RPPG exhibit less than about 20, 15, 10, 5, 2, or 1 percent decrease in volume after being aged for 1 day, 10 days, 30 days, or 60 days, or 90 days at a temperature of 50° C., 85° C., 100° C., 110° C., 120° C., 130° C., 140° C., or 150° C.

The HT-RRPG described herein may be used to improve the conformance of water flooding, for controlling water production and increasing of petroleum recovery, and as diverter for well stimulation. Therefore, in various embodiments, the HT-RPPG may be used in a method of forming a gel formation in a target zone of a subterranean environment. In certain embodiments, the subterranean environment is selected from the group consisting of wells and pipelines. In certain embodiments, the target zone is selected from the group consisting of fractures, conduits, lost-circulation zones, cavernous formations, high-permeability zones, wellbores, and perforations. The method generally comprises: (a) dispersing the HT-RPPG into a carrier fluid, thereby causing the swellable composition to swell; and (b) introducing the carrier fluid comprising the swellable composition into the target zone, thereby causing said re-crosslinking agent to react with said monomer and form said gel formation. The target zone generally has a temperature of at least 50° C., 85° C., 100° C., 110° C., 120° C., or 130° C., and/or less than 200° C., 190° C., 180° C., 170° C., or 160° C. In certain embodiments, the carrier fluid is selected from the group consisting of fresh water, produced water, sea water, brine, drilling fluid, and servicing fluid. In certain embodiments, the carrier fluid has a salinity of about 1,000 to about 60,000 mg/L of TDS. In certain embodiments, the HT-RPPG is dispersed into the carrier fluid at a weight ratio of about 1:1 to about 1:50, preferably 1:5 to about 1:20 dry HT-RPPG to carrier fluid.

In a particular embodiment, the present invention is directed to a plugging method. In oilfields, the preformed particles of the HT-RPPG can be pumped using fresh water, brine, or 'produced' water (i.e., water available on site for subterranean water flooding) as the carrier fluid. In subterranean conditions, the particles are transported along with the re-crosslinking agent that was embedded within the polymer matrix during gel synthesis, wherein all the constituents move as an entirety. Through proper placement of dry particle dispersions in a formation fluid into a target zone, the particles are accumulated in the fractures or conduits. Under the stimulus of reservoir temperature, the active re-crosslinking agent will cause all the particles to stick together, and thereby generate an elastic bulk gel based on the crosslinking reaction. This process, particularly the processing time, will be dependent on the reservoir temperature and the salinity of the carrier fluid, which can be artificially controlled locally by introducing reagents or additives into the placement fluid. After a re-crosslinking process time, a thermally stable gel with good mechanical integrity will block the target zone, and thereby divert the chased fluid to the unswept zone; the re-crosslinked gel acts as a robust, high-temperature suitable plugging agent and maintains stability under harsh conditions. Consequently, the HT-RPPGs herein overcomes flaws of previous polymer gels, such as extrusion, dehydration, and mechanical vulnerability, and offers a superior alternative for conformance control.

In another particular embodiment, the present invention is directed to a method for well drilling and well treatments. In drilling process, the HT-RPPG can be added to drilling fluid as lost circulation materials (LCM). At subterranean conditions, the re-crosslinked gel will seal off the lost-circulation zones including cavernous formations, inherent or induced fractures, and high-permeability zones. The excessive flooding fluid requirement and production loss thereby can be prevented or mitigated, to enhance the efficiency of oil resource recovery. In like fashion, the HT-RPPG can be mixed with the servicing fluids of various well treatments such as completion, sand production control and workover to control the flooding fluid loss.

In another particular embodiment, the HT-RPPG can be added to fracturing fluids as a particulate diverter. The HT-RPPG can be pumped during the stimulation; the particles will re-crosslink and block the wellbores, perforations or formation fractures; the resultant "barrier" will redirect the fluids to desired positions such as the perforation clusters. The fracturing efficiency herein will be ameliorated, and the stimulation process will be accelerated.

Additional advantages of the various embodiments of the invention will be apparent to those skilled in the art upon review of the disclosure herein and the examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

This invention can be further illustrated by the following examples of embodiments thereof, although it will be understood that these examples are included merely for the purposes of illustration and are not intended to limit the scope of the invention unless otherwise specifically indicated.

Example 1

A representative high temperature re-crosslinking preformed particle gel was prepared using free radical polymerization in solution.

The following abbreviations apply to all the Examples of the present application

| Abbreviation | Meaning |
|---|---|
| AM | Acrylamide |
| MBAM | N,N'-Methylenebis(acrylamide) |
| NVP | N-Vinylpyrrolidone |
| AMPS-Na | 2-acrylamido-2-methyl-1-propanesulfonic acid sodium salt |
| HPAM | Hydrolyzed polyacrylamide |
| APS | Ammonium persulfate |
| EDTA-2Na | Sodium salt of ethylenediaminetetraacetic acid |
| ALG | Sodium Alginate |

In a typical preparation, AM (22.5 g, 316.9 mmol) was added to the deionized water (100 mL). Under vigorous stirring, MBAM (1.75 mg, 0.011 mmol) and EDTA-2Na (900 mg, 2.67 mmol) were added. The chitosan (1685 mg) was slowly added to the solution and ultrasonication applied. The reaction was sparged with argon, and APS (200 mg, 0.875 mmol) was added. The mixture was then heated at 45° C. until the formation of the bulk gel. Polymerization was carried out for 8 hours, after which the bulk gel was dried and ground.

Example 2

A representative high temperature re-crosslinking preformed particle gel was prepared using free radical polymerization in solution.

In a typical preparation, AM (30 g, 422.5 mmol) and NVP (3 g, 26.99 mmol) were added to water (100 mL) containing dissolved HPAM (3000 ppm). Herein, the molecular weight of HPAM was 1.2 million Dalton, added as viscosifier to facilitate chitosan dispersion. Under vigorous stirring, MBAM (12 mg, 0.075 mmol) and ALG (200 mg) were added. Powdered chitosan (3000 mg) was slowly added to the solution; the dispersion was then subjected to ultrasonication. After sparging with argon, APS (100 mg, 0.436 mmol) was added. The dispersion was then heated at 45° C. until formation of the bulk gel. Polymerization was carried out for 4 hours, after which the bulk gel was dried and ground.

Example 3

A representative high temperature re-crosslinking preformed particle gel was prepared using free radical polymerization in solution.

In a typical preparation, AM (30 g, 422.5 mmol) and AMPS-Na (2 g) was added to (5000 ppm) to water (100 mL) containing dissolved HPAM (5000 ppm). Herein, the molecular weight of HPAM was 1.2 million Dalton, added as a viscosifier to facilitate chitosan dispersion. Under vigorous stirring, MBAM (4 mg, 0.025 mmol) and ALG (200 mg) were added. Powdered chitosan (2000 mg) was slowly added to the solution; the dispersion was then subjected to ultrasonication. After sparging with argon, APS (100 mg, 0.436 mmol) was added. The dispersion was then heated at 45° C. until the formation of the bulk gel. Polymerization was carried out for 4 hours, after which the bulk gel was dried and ground.

The invention claimed is:

1. A swellable composition for controlling fluid flow, said swellable composition comprising a polymer matrix comprising:
   polymer chains crosslinked by a crosslinking agent, said polymer chains including:
      a first monomer selected from the group consisting of acrylamide, methacrylamide, N-methylacrylamide, N-tert-butylacrylamide, N-ethylacrylamide, N-hydroxyethyl acrylamide, N-isopropylacrylamide, N,N-diethylacrylamide, dimethylaminopropyl acrylamide, dimethylaminopropyl methacrylamide, N,N-dimethylacrylamide, and N-vinyl formamide; and
      a second monomer selected from the group consisting of sulfonates, sulfates, phosphates, and 2-acrylamido-2-methyl-1-propanesulfonic acid sodium salt; and
   a re-crosslinking agent embedded within the polymer matrix and chosen from an aminated alginate, chitosan, aminated chitosan, a dextran amine, aminated cellulose, aminated guaran, or complexes thereof with a multivalent metal ion.

2. The swellable composition of claim 1, wherein said monomer comprises a sodium or potassium salt of vinylsulfonate, vinyl sulfate, phenyl vinyl sulfonate, phenyl vinyl sulfate, and/or vinyl phosphate.

3. The swellable composition of claim 1, wherein said polymer chains further comprise a monomer comprising diallyldimethylammonium chloride, (3-(methacryloylamino) propyl) trimethyl ammonium chloride, (2-(methacryloyloxy) ethyl) trimethyl ammonium chloride, vinylbenzyl trimethyl ammonium chloride, dimethylaminoethylacrylate methyl chloride quaternary salt, dimethylaminoethylacrylate benzyl chloride quaternary salt, and/or dimethylaminoethylmethacrylate methyl chloride quaternary salt.

4. The swellable composition of claim 1, wherein said polymer chains further comprise a monomer comprising hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), alkyl esters, a-olefins, vinyl alkylates, vinyl alkyl ethers, N-vinyl amides, and/or alkyl aromatics.

5. The swellable composition of claim 1, wherein said re-crosslinking agent is chitosan or aminated chitosan.

6. The swellable composition of claim 1, wherein said crosslinking agent comprises a divinyl monomer.

7. The swellable composition of claim 6, wherein said crosslinking agent comprises methylene bisacrylamide, divinyl sulfone, diethyleneglycol diallyl ether, or combinations thereof.

8. The swellable composition of claim 7, wherein said crosslinking agent comprises methylene bisacrylamide.

9. The swellable composition of claim 1, wherein said crosslinking agent comprises diacrylyl tertiary amide, diacrylylpiperazine, diallyltartardiamide, dihydroxyethylene-bis-acrylamide, bis-acrylylcystamine, trimethylolpropane trimethacrylate, propyleneglycol triacrylate, tripropyleneglycol diacrylate, allyl methacrylate, triethyleneglycol dimethacrylate, tetrahydrofurfuryl methacrylate, trimethylolpropane triacrylate, or combinations thereof.

10. The swellable composition of claim 1, wherein said crosslinking agent comprises a multifunctional crosslinker.

11. The swellable composition of claim 10, wherein said crosslinking agent comprises pentaerythritol triacrylate, 1,5 pentane diol dimethacrylate, pentaerythritol triallylether, or combinations thereof.

12. The swellable composition of claim 1, further comprising one or more additives, wherein said one or more additives comprise a chelating agent, a rheological modifier, a nanomaterial, a biocide, an oxygen scavenger, or combinations thereof.

13. The swellable composition of claim 12, wherein said one or more additives comprises a chelating agent and/or an oxygen scavenger.

14. The swellable composition of claim 1, wherein said polymer matrix is substantially free of $CO_2$-philic moieties.

15. A method of forming the swellable composition of claim 1, said method comprising:
   (a) polymerizing said monomer in the presence of said crosslinking agent and said re-crosslinking agent to form said polymer matrix and embed said re-crosslinking agent within said polymer matrix;
   (b) drying said polymer matrix to form a dried polymer matrix; and
   (c) grinding said dried polymer matrix to form said swellable composition.

16. The method of claim 15, wherein said polymerizing of step (a) occurs at a temperature of at least 20° C. and/or less than 200° C.

17. The method of claim 15, wherein said polymerizing of step (a) comprises ultrasonication.

18. The method of claim 17, wherein said ultrasonication occurs for at least 10 minutes and/or less than 6 hours.

19. The method of claim 15, wherein said polymerizing of step (a) occurs for at least 1 hour and/or less than 18 hours.

20. A method of forming a gel formation in a target zone of a subterranean environment, said method comprising:
   (a) dispersing the swellable composition of claim 1 into a carrier fluid, thereby causing said swellable composition to swell; and
   (b) introducing said carrier fluid comprising said swellable composition into said target zone having a temperature of at least 50° C., thereby causing said re-crosslinking agent to react with said monomer and form said gel formation.

21. The method of claim 20, wherein said carrier fluid is selected from the group consisting of fresh water, produced water, sea water, brine, and drilling fluid.

22. The method of claim 20, wherein said subterranean environment is selected from the group consisting of wells and pipelines.

23. The method of claim 20, wherein said target zone is selected from the group consisting of fractures, conduits, lost-circulation zones, cavernous formations, high-permeability zones, wellbores, and perforations.

24. The method of claim 20, wherein said swellable composition is in the form of particles having an initial average particle size prior to said contact and wherein upon contact with said fluid, said particles swell to a second average particle size that is at least about 5 times greater than that of the initial average particle size.

25. The method of claim 24, wherein said particles exhibit less than about 20 percent decrease in volume after exposure to said subterranean environment for 1 day.

\* \* \* \* \*